(12) United States Patent
Lee

(10) Patent No.: US 8,073,457 B2
(45) Date of Patent: Dec. 6, 2011

(54) DEVICE AND METHOD FOR CONTROLLING OVERLOAD

(75) Inventor: Woo-Suk Lee, Seoul (KR)

(73) Assignee: KT Corporation, Seoul (KR)

( * ) Notice: Subject to any disclaimer, the term of this patent is extended or adjusted under 35 U.S.C. 154(b) by 764 days.

(21) Appl. No.: 12/179,484

(22) Filed: Jul. 24, 2008

(65) Prior Publication Data
US 2008/0299986 A1    Dec. 4, 2008

Related U.S. Application Data (63) Continuation of application No. PCT/KR2007/004461, filed on Sep. 17, 2007.

(30) Foreign Application Priority Data

Oct. 31, 2006    (KR) .................... 10-2006-0106745

(51) Int. Cl.
*H04W 72/00*    (2009.01)

(52) U.S. Cl. ...................... 455/453; 455/450
(58) Field of Classification Search .......... 455/450–453, 455/522
See application file for complete search history.

(56) References Cited

U.S. PATENT DOCUMENTS

| 7,024,203 B1 * | 4/2006 | Naghian | 455/453 |
|---|---|---|---|
| 7,376,437 B2 * | 5/2008 | Molkdar et al. | 455/522 |
| 2004/0165529 A1 * | 8/2004 | Lee | 370/230 |

FOREIGN PATENT DOCUMENTS

| EP | 1100283 | 5/2001 |
|---|---|---|
| EP | 1389888 | 2/2004 |
| JP | 2003-299131 | 10/2003 |
| KR | 0128840 B1 | 4/1998 |
| KR | 0175465 B1 | 4/1999 |
| WO | WO 01/86988 | 11/2001 |

OTHER PUBLICATIONS

International Search Report for International Application No. PCT/KR2007/004461 dated Dec. 18, 2007.

(Continued)

*Primary Examiner* — George Eng
*Assistant Examiner* — Nam Huynh
(74) *Attorney, Agent, or Firm* — Knobbe, Martens, Olson & Bear LLP (57) ABSTRACT

An overload control device and a method thereof in a radio network controller are disclosed. One embodiment of the present invention includes i) a load measuring unit, measuring a load of a radio network controller every predetermined time, ii) an overload determining unit, determining whether an overload is generated by comparing the measured load with a predetermined critical value, iii) a parameter setting unit, setting a parameter of a call admission ratio according to an overload level if the overload is generated as the result of determining, the call admission ratio indicating a ratio of a maximum transmitting output as compared with an admitted transmitting output of a base station and iv) a call connection setting control unit, transmitting to the radio network controller a call connection setting signal to limit new call connection setting of a base station having a total transmitting output value which is larger than an admitted transmitting output value set by the parameter of the call admission ratio of the base station among all base stations pertained to the radio network controller.

15 Claims, 5 Drawing Sheets

OTHER PUBLICATIONS

Japanese Office Action for App: 2008-549437 dated May 10, 2011.

Kasera, et al., "Congestion Control Policies for IP-Based CDMA Radio Access Networks", IEEE Transactions on Mobile Computing, IEEE Service Center, Los Alamitos, CA, US, vol. 4, No. 4, 2005-0701, pp. 349-362.

Jorguseski, et al., "Radio Resource Allocation in Third-Generation Mobile Communication Systems", IEEE Communications Magazine, IEEE Service Center, Piscataway, US, vol. 39, No. 2, 2001-02-01, pp. 117-123.

European Search Report for App: 07808251.8 dated May 31, 2011; with European Office Action Abstract.

* cited by examiner

DEVICE AND METHOD FOR CONTROLLING OVERLOAD

RELATED APPLICATIONS

This application is a continuation application, and claims the benefit under 35 U.S.C. §§120 and 365 of PCT Application No. PCT/KR2007/004461, filed on Sep. 17, 2007, which is hereby incorporated by reference.

BACKGROUND OF THE INVENTION

1. Field of the Invention

The present invention relates to an overload control device and a method thereof in a mobile communication system, more specifically to an overload control device and a method thereof in a radio network controller.

2. Description of the Related Technology

A mobile communication service has been continuously developed since the first generation mobile communication service mainly having a low-quality voice call service provided by the advanced mobile phone service (AMPS) of an analog cellular type, which started in late 1980s.

In the second generation mobile communication service, it was possible to provide an improved voice call service and a low-speed (14.4 Kbps) data service by the global system for mobile (GSM), the code division multiple access (CDMA) and the time division multiple access (TDMA) of a digital cellular type.

In the 2.5th generation mobile communication service, it was also possible to provide an improved voice call service and a low-speed (144 Kbps) data service by developing the personal communication service (PCS) that can be internationally used in addition to acquiring frequency bands having the unit of GHz.

The third generation mobile communication service can be distinguished into two systems. One is the mobile communication system of an asynchronous type based on the generation partnership project (3GPP). The other one is the CDMA-2000 system of a synchronous type based on 3GPP2. Especially, in the mobile communication system, which is the wireless protocol suggested in the IMT-2000, is being provided or prepared by a lot of worldwide communication service providers.

The mobile communication system, which has a high quality call service and uses a band diffusion method, is suitable to transmit a lot of data.

The WCDMA communication method employs the adaptable multi-rate (AMR) for voice coding and supports high mobility that can make it possible to call to each other at a speed of 100 km/h.

The WCDMA communication method is also employed by most countries. Technical specifications for the WCDMA is continuously developed in the 3GPP constituted by many institutes in Korea, Europe countries, Japan, USA and China.

Typically, service providers or network operators provides different users with various multi-media data services and/or voice communication services.

To provide the data services and/or the voice communication services, the service providers or the network operators manage wireless sources including system capacity and processing amount.

A mobile communication terminal can access a communication system and a different mutually accessed remote control communication system. Each area covered by radio networks are typically referred to as a cell. Each radio network is set to receive an electromagnetic wave at a pilot output level in which it is enough to cover the cell. The pilot channel is downlink-broadcasted to make it possible to recognize cells and to measure received levels.

SUMMARY OF CERTAIN INVENTIVE ASPECTS

One aspect of the present invention is an overload control device and a method thereof that can promptly and efficiently control an overload by concentratedly controlling calls of base stations of an area in which the overload is generated when the overload is generated in a radio network controller.

Another aspect of the present invention is an overload control device and a method thereof that can prevent an output amplifier from being deteriorated and the quality of previously set calls from being lowered through efficiently controlling an overload by a radio network controller.

Another aspect of the present invention features an overload control device in a mobile communication system.

According to an embodiment of the present invention, the overload control device can include a load measuring unit, measuring a load of a radio network controller every predetermined time; an overload determining unit, determining whether an overload is generated by comparing the measured load with a predetermined critical value; a parameter setting unit, setting a parameter of a call admission ratio according to an overload level if the overload is generated as the result of determining, the call admission ratio indicating a ratio of a maximum transmitting output as compared with an admitted transmitting output of a base station; and a call connection setting control unit, transmitting to the radio network controller a call connection setting signal to limit new call connection setting of a base station having a total transmitting output value which is larger than an admitted transmitting output value set by the parameter of the call admission ratio of the base station among all base stations pertained to the radio network controller.

Another aspect of the present invention features a method of controlling an overload in a mobile communication system.

According to an embodiment of the present invention, the method of controlling an overload in a mobile communication system can include measuring a load of a radio network controller every predetermined time; determining whether an overload is generated by comparing the measured load with a predetermined critical value; setting a parameter of a call admission ratio according to an overload level if the overload is generated as the result of determining, the call admission ratio indicating a ratio of a maximum transmitting output as compared with an admitted transmitting output of a base station; and transmitting to the radio network controller a call connection setting signal to limit new call connection setting of a base station having a total transmitting output value which is larger than an admitted transmitting output value set by the parameter of the call admission ratio of the base station among all base stations pertained to the radio network controller.

Another aspect of the invention is an overload control device in a mobile communication system, the device comprising: i) a load measuring unit configured to substantially periodically measure a load of a radio network controller, ii) an overload determining unit configured to determine whether an overload is generated based on the comparison of the measured load and a predetermined critical value, iii) a parameter setting unit configured to set a parameter of a call admission ratio according to a level of the determined overload, wherein the call admission ratio indicates a ratio of a maximum transmitting output and an admitted transmitting output of a base station and iv) a call connection setting control unit configured to transmit, to the radio network controller, a call connection setting signal to limit new call connection setting of a base station having a total transmitting output value which is larger than an admitted transmitting output value set by the parameter of the call admission ratio of the base station among all base stations associated with the radio network controller.

In the above device, information related to the measured load may be related to i) calls set by being input into the base station associated with the radio network controller or ii) the total transmitting output information of the radio network controller. In the above device, the parameter of the call admission ratio may be classified into at least one overload grade according to the determined overload level. In the above device, the parameter of the call admission ratio may comprise at least three overload grades which are different from each other. In the above device, the parameter of the call admission ratio may comprise a minor level, a major level and a critical level. In the above device, the call admission ratio of the minor level may be set to be higher than that of the major level, and wherein the call admission ratio of the major level may be set to be higher than that of the critical level. In the above device, the overload control device may be configured to be included in the radio network controller as a part or as a separate device, to be linked with the radio network controller.

Another aspect of the invention is an overload control method in a mobile communication system, the method comprising: i) substantially periodically measuring a load of a radio network controller, ii) determining whether an overload is generated based on the comparison of the measured load and a predetermined critical value, iii) setting a parameter of a call admission ratio according to a level of the determined overload, wherein the call admission ratio indicates a ratio of a maximum transmitting output and an admitted transmitting output of a base station and iv) transmitting, to the radio network controller, a call connection setting signal to limit new call connection setting of a base station having a total transmitting output value which is larger than an admitted transmitting output value set by the parameter of the call admission ratio of the base station among all base stations associated with the radio network controller.

In the above method, the measuring may comprise receiving information related to calls set by being input into the base station associated with the radio network controller or the total transmitting output information of the radio network controller. In the above method, the setting may comprise classifying the overload level of the radio network controller into a plurality of overload grades and setting the parameter of the call admission ratio differently according to the classified overload grades. In the above method, the parameter of the call admission ratio may comprise a lowest level, a middle level and a highest level.

Another aspect of the invention is one or more processor-readable storage devices having processor-readable code, the processor-readable code which, when executed by one or more processors, performs an overload control method in a mobile communication system, the method comprising: i) substantially periodically measuring a load of a radio network controller, ii) determining whether an overload is generated based on the comparison of the measured load and a predetermined critical value, iii) setting a parameter of a call admission ratio according to a level of the determined overload, wherein the call admission ratio indicating a ratio of a maximum transmitting output and an admitted transmitting output of a base station and iv) transmitting, to the radio network controller, a call connection setting signal to limit new call connection setting of a base station having a total transmitting output value which is larger than an admitted transmitting output value set by the parameter of the call admission ratio of the base station among all base stations associated with the radio network controller.

Still another aspect of the invention is an overload control device in a mobile communication system, the device comprising: i) means for substantially periodically measuring a load of a radio network controller, ii) means for determining whether an overload is generated based on the comparison of the measured load and a predetermined critical value, iii) means for setting a parameter of a call admission ratio according to a level of the determined overload, wherein the call admission ratio indicates a ratio of a maximum transmitting output and an admitted transmitting output of a base station and iv) means for transmitting, to the radio network controller, a call connection setting signal to limit new call connection setting of a base station having a total transmitting output value which is larger than an admitted transmitting output value set by the parameter of the call admission ratio of the base station among all base stations associated with the radio network controller.

In the above device, the parameter of the call admission ratio may comprise at least three overload grades which are different from each other. In the above device, the parameter of the call admission ratio may comprise a minor level, a major level and a critical level, wherein the call admission ratio of the minor level may be set to be higher than that of the major level, and wherein the call admission ratio of the major level may be set to be higher than that of the critical level.

DETAILED DESCRIPTION OF CERTAIN INVENTIVE EMBODIMENTS

Figure 1:
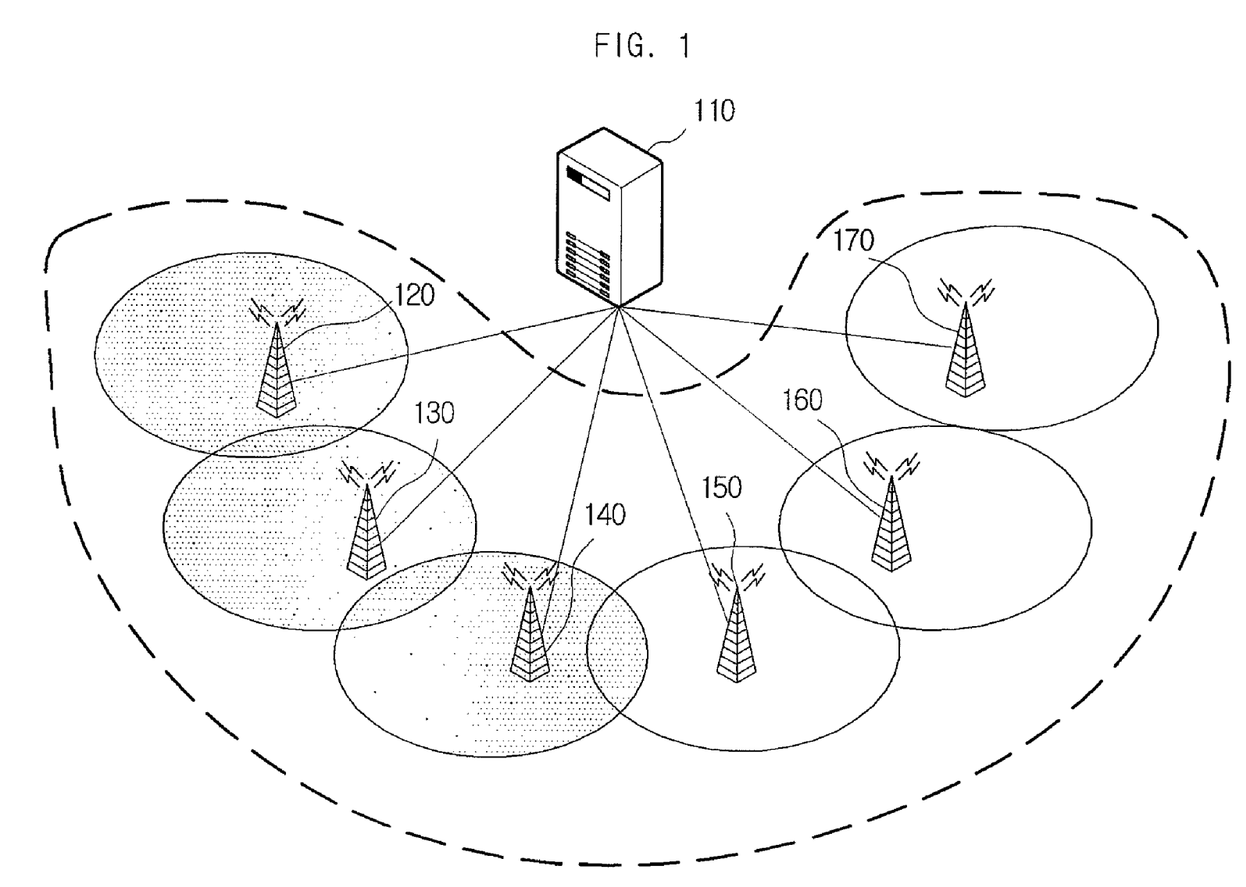
FIG. 1 is a diagram for illustrating a method of controlling an overload in a typical radio network controller.

FIG. 1 is a diagram for illustrating a method of controlling an overload in a typical radio network controller.

Referring to FIG. 1, the radio network controller (RNC) 110 can be coupled to various base stations through a T1/E1 line or circuit, an ATM virtual circuit, a cable or an optical digital subscriber line (DSL). Typically, the radio network controller 110 controls the accessed base stations 120 through 170 and performs handover and provides an operation time and a system management service.

If an overload is generated, the RNC 110 limits a transmitted call, a received call and a position input number, input into the RNC 110, in order to control the overload. In this case, since the calls input per each base station are considered for the transmitted call, the received call and the position input number, limited by the RNC 110, the difference between the calls input in units of base stations 120 through 170, accessed to the pertinent RNC 110, is not reflected. However, in case that the overload is generated after many calls are input into the RNC 110, the overload is mostly generated not because many calls are input into the RNC 110 in all base stations 120 through 170 but because many calls are input into the RNC 110 in some base stations 120, 130 and 140, for example, of a particular area.

Accordingly, the RNC 110 can more efficiently control the overload through controlling calls of some base stations 120, 130 and 140, for example, at a certain area into which many calls is input instead of controlling all input calls.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, certain embodiments will be described in detail with reference to the accompanying drawings. Identical or corresponding elements will be given the same reference numerals, regardless of the figure number, and any redundant description of the identical or corresponding elements will not be repeated.

The present invention can be applied to various mobile communication systems. The below description is mainly related to a WCDMA mobile communication system for example.

Figure 2:
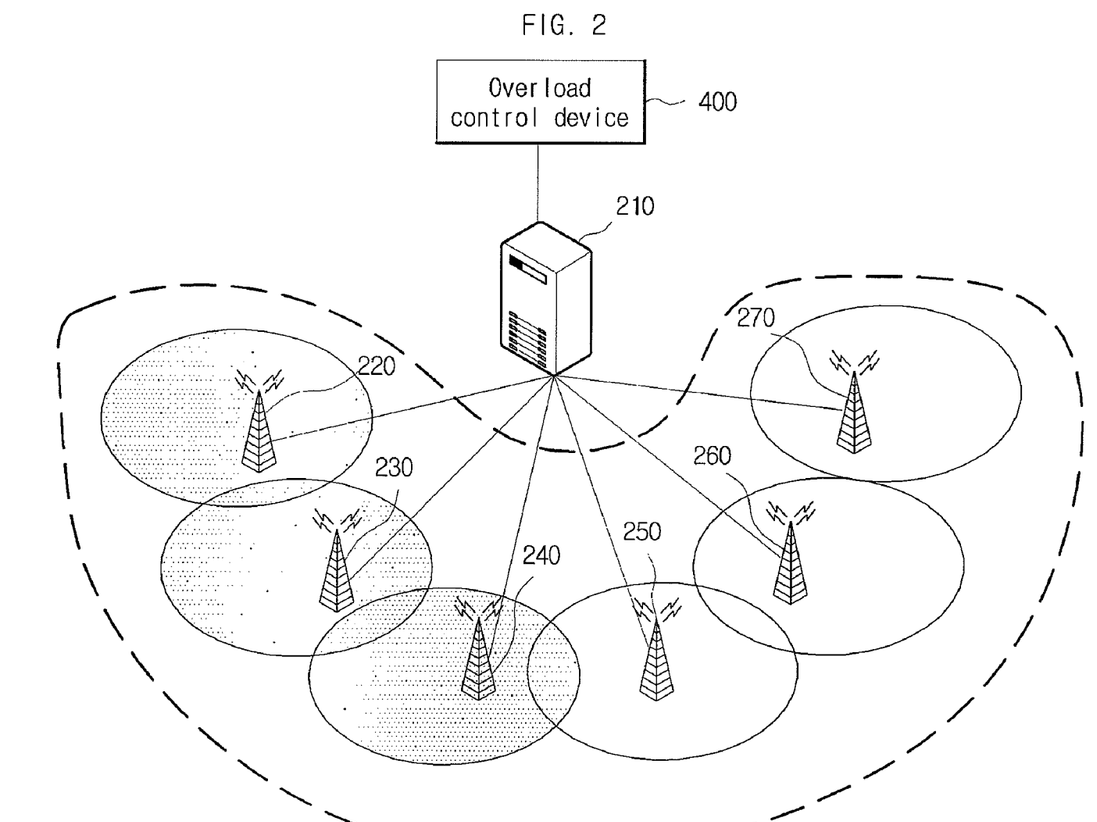
FIG. 2 and FIG. 3 are diagrams for illustrating a method of controlling an overload in a radio network controller in accordance with an embodiment of the present invention.

FIG. 2 is a diagram for illustrating a method of controlling an overload in accordance with an embodiment of the present invention.

In one embodiment, the overload control device 400 is connected to an RNC 210. When an overload is generated, a call admission control function is operated, to thereby solve the overload efficiently by controlling calls of the base stations 220, 230 and 240, for example, into which the traffic is concentratedly input.

Referring to FIG. 2, the RNC 210 is connected to the overload control device 400 that controls the overload of the RNC 210.

The RNC 210 can be coupled to various base stations through a T1/E1 line or circuit, an ATM virtual circuit, a cable or an optical digital subscriber line (DSL).

The radio network controller 210 controls the accessed base stations 220 through 270 and performs handover and provides an operation time and a system management service.

The base stations 220 through 270 perform voice communication and data communication with a mobile communication terminal (not shown) by the control of the RNC 210.

The base stations 220 through 270 transmit total transmitting output information to the overload control device 400. Here, the total transmitting output information, which refers to total output information required to transmit a call during a predetermined period, can be energy of carrier/interference of other's (Ec/Io), for example, measured in the base stations 220 through 270.

The base stations 220 through 270 allows call connection setting to be limited by a call admission ratio set corresponding to an overload level of the RNC 210.

For example, if an overload is generated in the RNC 210 because the total transmitting output of some base stations 220, 230 and 240, for example, is higher than other base stations, the RNC 210 does not permit the call connection setting for new calls of some base stations 220, 230 and 240, for example, by the call admission ratio set corresponding to the overload level.

Accordingly, the RNC 210 can control the overload of the RNC 210 by controlling some base stations 220, 230 and 240, for example, having much traffic.

The overload control device 400 measures the overload level of the RNC 210 and performs the call admission control corresponding to the overload level of the RNC 210.

The overload control device 400 controls the RNC 210 to control the call input for some base stations 220, 230 and 240, for example, into which the traffic is concentratedly input through call admission control.

Here, the overload level of the RNC 210 can be measured by measuring the number of calls set and input from all base stations 220 through 270 or the total transmitting output of the RNC 210.

The overload control device 400 can determine a base station into which the traffic is concentratedly input by receiving a total transmitting output value of each base station 220 through 270 from all base stations 220 through 270 during each predetermined period.

If the overload is generated in the RNC 210, the overload control device 400 sets the call admission ratio corresponding to the overload level.

The overload control device 400 controls the RNC 210 to make it impossible to set a new call for the base station having relative much traffic by setting the call admission ratio.

Accordingly, the overload control device 400 can control the overload of the RNC 210 by controlling call connection setting for a base station into which the traffic is concentratedly input.

The overload control device 400 will be described in more detail with reference to FIG. 4.

Figure 3:
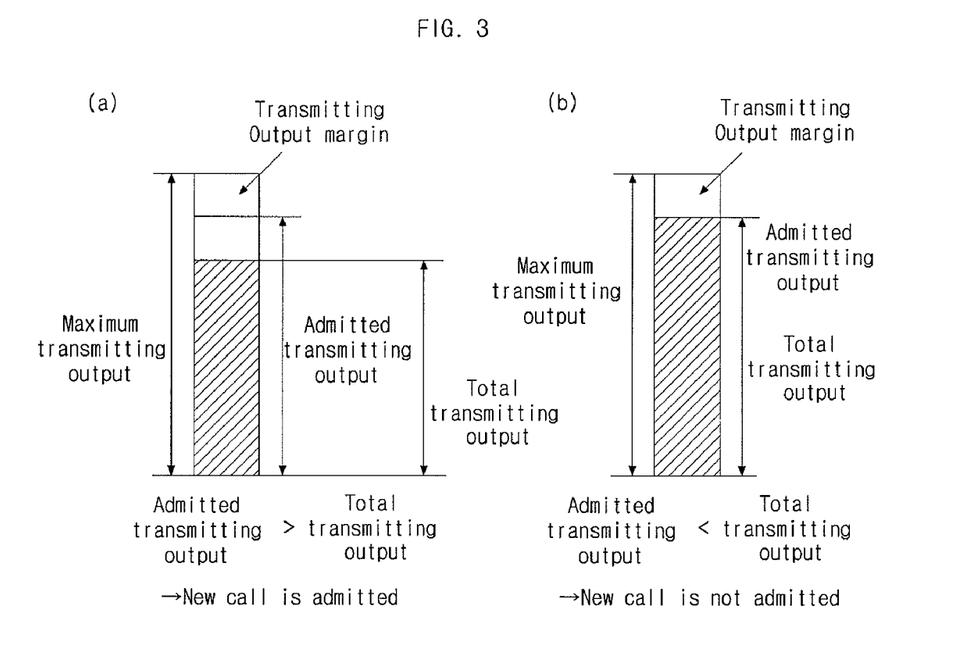

FIG. 3 is a diagram for illustrating a method of controlling an overload in accordance with an embodiment of the present invention.

The call admission ratio, which is the ratio of maximum transmitting output as compared with the admitted transmitting output of the base stations 220 through 270, can be computed by the following formula I.

Call admission ratio=Admitted transmitting output (Call Admission Power)/maximum transmitting output(Max Tx Power)     Formula 1

Here, the maximum transmitting output, which is dependable on equipment types of each base station and output environments, is predetermined by a designer or an operator.

As described above, the overload control device 400 controls the RNC 210 not to permit the call connection setting for new calls of some base stations 220, 230 and 240, for example, having much traffic by the call admission ratio set corresponding to the overload level of the RNC 210.

Accordingly, the RNC 210 can control the overload.

Hereinafter, an overload control method will be described in more detail with reference to (a) and (b) of FIG. 3.

In case that the admitted transmitting output, which is set by the call admission ratio set corresponding to the overload level of the RNC 210, is larger than the total transmitting output of the base station, the overload control device 400 controls the RNC 210 so as to allow new call connection setting of some base stations 250, 260 and 270, for example, to be permitted.

However, in case that the admitted transmitting output, which is set by the call admission ratio set corresponding to the overload level of the RNC 210, is the same as or smaller than the total transmitting output of the base station, the overload control device 400 controls the RNC 210 so as to make it impossible to set new call connection of the pertinent base station.

For example, if the call admission ratio set corresponding to the overload level of the RNC 210 is 90%, the value corresponding to 90% of the maximum transmitting output of the base station is set as an admitted transmitting output value.

Accordingly, in the base station having the larger admitted transmitting output corresponding to 90% of the maximum transmitting output value than the total transmitting output value among the base stations pertained to the RNC, a new call is permitted. However, in the base station having the same or smaller admitted transmitting output corresponding to 90% of the maximum transmitting output value as or than the total transmitting output among the base stations pertained to the RNC, a new call is not permitted.

Figure 4:
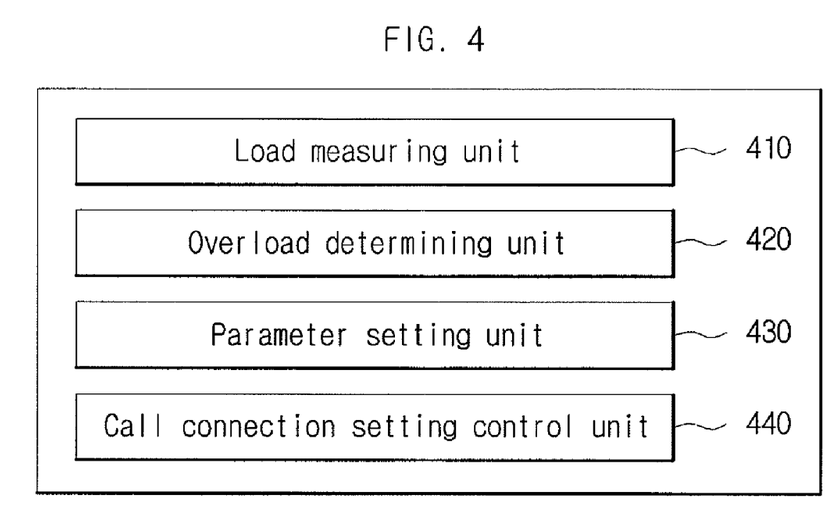
FIG. 4 is a block diagram illustrating an overload control device in accordance with an embodiment of the present invention.

FIG. 4 is a block diagram illustrating an overload control device in accordance with an embodiment of the present invention.

Referring to FIG. 4, the overload control device 400 includes a load measuring unit 410 measuring the load of the RNC 210 every predetermined time, an overload determining unit 420 determining whether an overload is generated by comparing the measured load with a predetermined critical value, a parameter setting unit 430 controlling a parameter of call admission ratio corresponding to an overload level and a call connection setting control unit 440 transmitting a control signal controlling whether to permit new call connection setting of a base station having much traffic among the base stations 220 through 270 by a parameter of the call admission ratio set corresponding to the overload level. Here, the overload control device 400 can be included in the RNC 210 as a part. Alternatively, the overload control device 400 can be connected to the RNC 210 as an additional device.

The load measuring unit 410 measures the load of the RNC 210 every predetermined time. Here, information related to the measured load of the RNC 210 can be the number of calls set by being input into the base station 220 through 270 connected to the RNC 210 or the total transmitting output of the RNC 210.

The overload determining unit 420 determines the overload level of the RNC 210 by comparing the measured load of the RNC 210 received from the load measuring unit 410 with a predetermined critical value.

The overload determining unit 420 can classify the overload level of the RNC 210 into a minor level, a major level and a critical level. The parameter of the call admission ratio controlling the overload according to the distinguished levels can be set to efficiently manage the resources of system according to the overload level.

The parameter setting unit 430 sets the parameter of the call admission ratio corresponding to the overload level. The parameters of the call admission ratio set corresponding to the overload of the RNC 210 are charted in the following table 1.

TABLE 1

| Parameter | Meaning | Remark |
| --- | --- | --- |
| Critical_CA_Ratio | Call admission ratio (%) when the load ratio is critical level | |
| Major_CA_Ratio | Call admission ratio (%) when the load ratio is major level | |
| Minor_CA_Ratio | Call admission ratio (%) when the load ratio is minor level | |
| Normal_CA_Ratio | Call admission ratio (%) when an overload is not generated | |

The parameter of the call admission ratio can be classified into a minor level, a major level and a critical level corresponding to the overload level. The classification standard is dependable on equipment types of the RNC 210 and surrounding environments, is predetermined by a designer or an operator.

Here, the minor level indicates the low overload level of the RNC 210, and the major level indicates the high overload level of the RNC 210. The critical level indicates the very high overload level of the RNC 210.

Accordingly, the call admission ratio of the minor level can be set to be higher than that of the major level. Also, the call admission ratio of the major level can be set to be higher than that of the critical level.

This is to efficiently manage the resources of system according to the overload level.

The call connection setting control unit 440 transmits to the RNC 210 a control signal controlling whether to permit new call connection setting of a base station having much traffic among the base stations 220 through 270 by a parameter of the call admission ratio set, as shown in the above table 1, corresponding to the overload level of the RNC 210.

The call connection setting control unit 440, which is linked to an operation server of a mobile communication system, stores maximum transmitting electric power information of each base station.

Also, the call connection setting control unit 440 receives the total transmitting output information of all base stations 220 through 270 pertained to the RNC 210 in order to determine the base stations having much traffic among the base stations 220 through 270.

Here, the total transmitting output information, which refers to total output information required to transmit a call during a predetermined period, can be energy of carrier/interference of other's (Ec/Io) measured in the base stations 220 through 270.

The call connection setting control unit 440 controls the RNC 210 by generating a control signal restricting new call connection setting for the base station in which the total transmitting output (total Tx power) per base station is larger than admitted transmitting output corresponding to the previously set call admission ratio. Here, since the call connection setting control unit 440 can compute admitted transmitting output per base station corresponding to the previously set call admission ratio by using the stored maximum transmitting output information per base station, it is possible to compare the admitted transmitting output per base station with the total transmitting output per base station.

Figure 5:
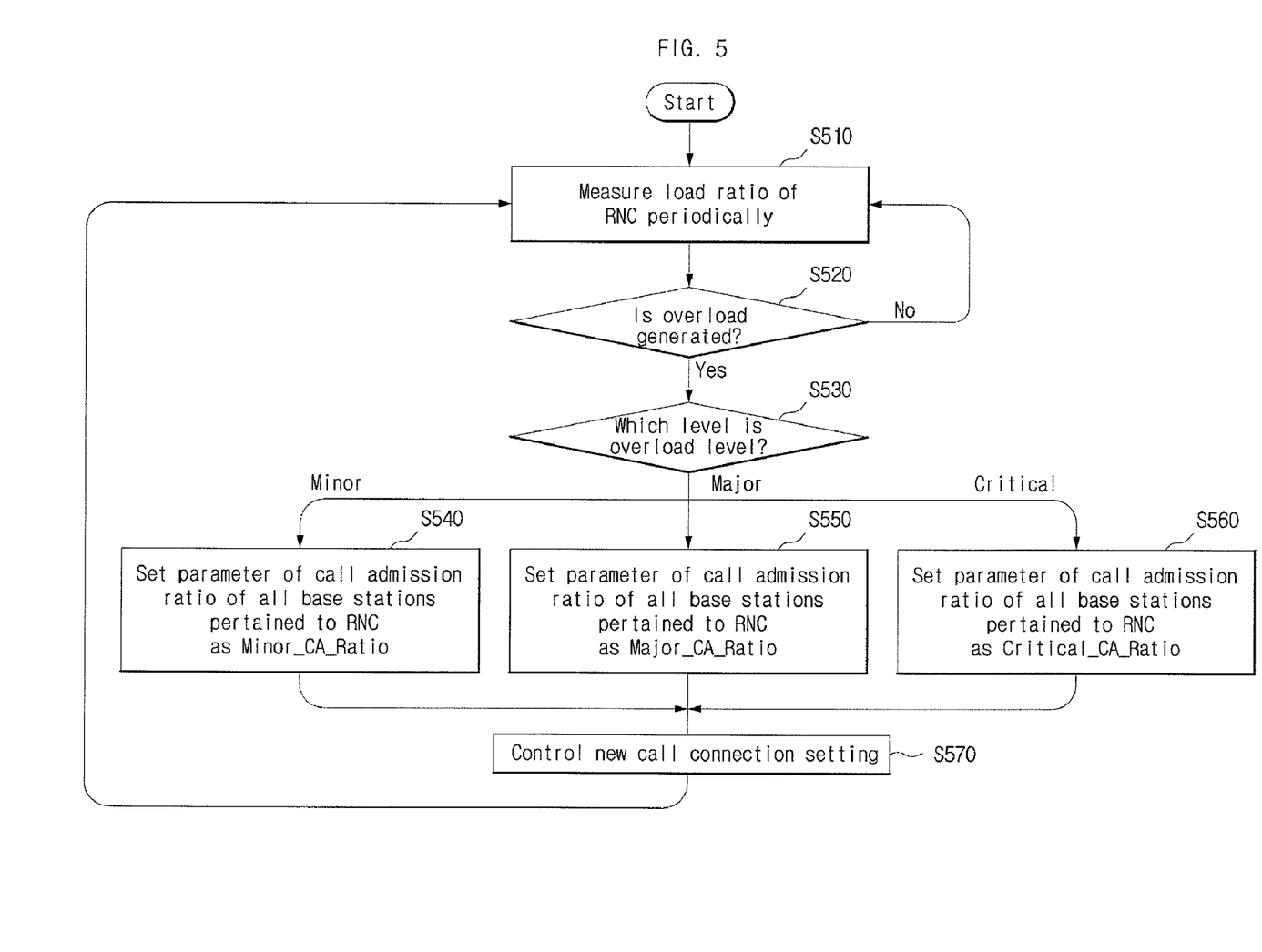
FIG. 5 is a flow chart illustrating a method of controlling an overload in accordance with an embodiment of the present invention.

FIG. 5 is a flow chart illustrating a method of controlling an overload in accordance with an embodiment of the present invention.

In a step represented by S510, the overload control device 400 measures the load of the RNC 210 every predetermined time. Here, information related to the measured load of the RNC 210 can be the number of calls set by being input into the base station 220 through 270 connected to the RNC 210 or the total transmitting output of the RNC 210.

In a step represented by S520, the overload control device 400 determines whether an overload is generated in the RNC 210 by comparing the load measured in the RNC 210 with a predetermined critical value. If it is determined that the overload is generated in the RNC 210, the overload control device 400 performs an operation corresponding to an overload control algorithm corresponding to each overload level.

In a step represented by S530, if it is determined that the overload is generated in the RNC 210, the overload control device 400 can classify the overload level of the RNC 210 into a minor level, a major level and a critical level. Here, the minor level indicates the low overload level of the RNC 210, and the critical level indicates the very high overload level of the RNC 210. Accordingly, the call admission ratio of the minor level can be set to be higher than that of the major level. Also, the call admission ratio of the major level can be set to be higher than that of the critical level.

The overload control device 400 can set the parameter of the call admission ratio controlling the overload differently according to the classified overload level. This is to efficiently manage the resources of system according to the overload level In a step represented by S540, if the overload level is the minor level, the parameter of the call admission ratio of all base stations 220 through 270 pertained to the RNC 210 is set as a predetermined Minor_CA_Ratio.

In a step represented by S550, if the overload level is the major level, the parameter of the call admission ratio of all base stations 220 through 270 pertained to the RNC 210 is set as a predetermined Major_CA_Ratio.

In a step represented by S560, if the overload level is the critical level, the parameter of the call admission ratio of all base stations 220 through 270 pertained to the RNC 210 is set as a predetermined Critical_CA_Ratio.

In a step represented by S570, the overload control device 400 generates a control signal restricting new call setting in the base station in which the total transmitting output is higher than the admitted transmitting electrical power corresponding to the parameter of the call admission ratio in accordance with the overload level to the RNC 210.

Accordingly, the overload of the RNC 210 can be promptly and efficiently controlled by concentratedly controlling calls of the base stations having relatively much traffic.

The method according to embodiments of the present invention as described above can be stored in a recorded medium (e.g. CDRom, RAM, ROM, floppy disk, hard disk, magneto-optical disk) having shapes capable of being realized with a program and readable by a computer.

At least one embodiment of the present invention can provide an overload control device and a method thereof that can promptly and efficiently control an overload by concentratedly controlling calls of base stations of an area in which the overload is generated when the overload is generated in a radio network controller.

At least one embodiment of the present invention can also provide an overload control device and a method thereof that can prevent an output amplifier from being deteriorated and the quality of previously set calls from being lowered through efficiently controlling an overload by a radio network controller.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. An overload control device in a mobile communication system, the device comprising:
    a load measuring unit configured to substantially periodically measure a load of a radio network controller;
    an overload determining unit configured to determine whether an overload is generated based on the comparison of the measured load and a predetermined critical value;
    a parameter setting unit configured to set a parameter of a call admission ratio according to a level of the determined overload, wherein the call admission ratio indicates a ratio of a maximum transmitting output and an admitted transmitting output of a base station; and
    a call connection setting control unit configured to transmit, to the radio network controller, a call connection setting signal to limit new call connection setting of a base station having a total transmitting output value which is larger than an admitted transmitting output value set by the parameter of the call admission ratio of the base station among all base stations associated with the radio network controller.

2. The overload control device of claim 1, wherein information related to the measured load is related to i) calls set by being input into the base station associated with the radio network controller or ii) the total transmitting output information of the radio network controller.

3. The overload control device of claim 1, wherein the parameter of the call admission ratio is classified into at least one overload grade according to the determined overload level.

4. The overload control device of claim 3, wherein the parameter of the call admission ratio comprises at least three overload grades which are different from each other.

5. The overload control device of claim 3, wherein the parameter of the call admission ratio comprises a minor level, a major level and a critical level.

6. The overload control device of claim 5, wherein the call admission ratio of the minor level is set to be higher than that of the major level, and wherein the call admission ratio of the major level is set to be higher than that of the critical level.

7. The overload control device of claim 1, wherein the overload control device is configured to be included in the radio network controller as a part or as a separate device, to be linked with the radio network controller.

8. An overload control method in a mobile communication system, the method comprising:
substantially periodically measuring a load of a radio network controller;
determining whether an overload is generated based on the comparison of the measured load and a predetermined critical value;
setting a parameter of a call admission ratio according to a level of the determined overload, wherein the call admission ratio indicates a ratio of a maximum transmitting output and an admitted transmitting output of a base station; and
transmitting, to the radio network controller, a call connection setting signal to limit new call connection setting of a base station having a total transmitting output value which is larger than an admitted transmitting output value set by the parameter of the call admission ratio of the base station among all base stations associated with the radio network controller.

9. The method of claim 8, wherein the measuring comprises receiving information related to calls set by being input into the base station associated with the radio network controller or the total transmitting output information of the radio network controller.

10. The method of claim 8, wherein the setting comprises classifying the overloadlevel of the radio network controller into a plurality of overload grades and setting the parameter of the call admission ratio differently according to the classified overload grades.

11. The method of claim 10, wherein the parameter of the call admission ratio comprises a lowest level, a middle level and a highest level.

12. One or more processor-readable storage devices having processor-readable code, the processor-readable code which, when executed by one or more processors, performs an overload control method in a mobile communication system, the method comprising:
substantially periodically measuring a load of a radio network controller;
determining whether an overload is generated based on the comparison of the measured load and a predetermined critical value;
setting a parameter of a call admission ratio according to a level of the determined overload, wherein the call admission ratio indicating a ratio of a maximum transmitting output and an admitted transmitting output of a base station; and
transmitting, to the radio network controller, a call connection setting signal to limit new call connection setting of a base station having a total transmitting output value which is larger than an admitted transmitting output value set by the parameter of the call admission ratio of the base station among all base stations associated with the radio network controller.

13. An overload control device in a mobile communication system, the device comprising:
means for substantially periodically measuring a load of a radio network controller;
means for determining whether an overload is generated based on the comparison of the measured load and a predetermined critical value;
means for setting a parameter of a call admission ratio according to a level of the determined overload, wherein the call admission ratio indicates a ratio of a maximum transmitting output and an admitted transmitting output of a base station; and
means for transmitting, to the radio network controller, a call connection setting signal to limit new call connection setting of a base station having a total transmitting output value which is larger than an admitted transmitting output value set by the parameter of the call admission ratio of the base station among all base stations associated with the radio network controller.

14. The overload control device of claim 13, wherein the parameter of the call admission ratio comprises at least three overload grades which are different from each other.

15. The overload control device of claim 13, wherein the parameter of the call admission ratio comprises a minor level, a major level and a critical level, wherein the call admission ratio of the minor level is set to be higher than that of the major level, and wherein the call admission ratio of the major level is set to be higher than that of the critical level.

* * * * *